(12) United States Patent
Forbes et al.

(10) Patent No.: US 6,821,587 B2
(45) Date of Patent: Nov. 23, 2004

(54) PROCESSES OF USING AT LEAST ONE ABSORBENT POUCH

(76) Inventors: Alan H. Forbes, 583 Eleanor Rd., Victor, NY (US) 14564; William F. Patchen, 1153 Meadowbrook La., Farmington, NY (US) 14425; Wen Pao Wu, 4 Silver Pines Dr., Pittsford, NY (US) 14534

( * ) Notice: Subject to any disclaimer, the term of this patent is extended or adjusted under 35 U.S.C. 154(b) by 0 days.

(21) Appl. No.: 10/277,422

(22) Filed: Oct. 22, 2002

(65) Prior Publication Data

US 2003/0054122 A1 Mar. 20, 2003

Related U.S. Application Data

(62) Division of application No. 09/373,291, filed on Aug. 12, 1999, now Pat. No. 6,491,993.

(51) Int. Cl.[7] .................... B32B 27/08; B32B 27/10; B32B 27/32; B32B 33/00
(52) U.S. Cl. .................. 428/34.2; 206/484; 206/524.1; 206/557; 426/108; 426/124
(58) Field of Search .................... 428/34.2, 35.7, 428/34.3; 206/484, 557, 524.1; 426/108, 124

(56) References Cited

U.S. PATENT DOCUMENTS

| | | | | |
|---|---|---|---|---|
| 4,260,311 A | * | 4/1981 | Hanses | 414/129 |
| 4,429,001 A | | 1/1984 | Kolpin et al. | 428/283 |
| 4,533,585 A | | 8/1985 | Holden | 428/116 |
| 4,573,988 A | | 3/1986 | Pieniak et al. | 604/379 |
| 4,576,278 A | | 3/1986 | Laiewski et al. | 206/204 |
| 4,699,823 A | | 10/1987 | Kellenberger et al. | 428/219 |
| 4,702,377 A | | 10/1987 | Gröne | 206/557 |
| RE33,143 E | | 1/1990 | Gröne | 206/557 |
| 4,929,480 A | | 5/1990 | Midkiff et al. | 428/35.6 |
| 4,940,621 A | | 7/1990 | Rhodes et al. | 428/137 |
| 4,949,897 A | | 8/1990 | Pawiak et al. | 229/2.5 R |
| 4,983,390 A | | 1/1991 | Levy | 424/404 |
| 5,022,945 A | | 6/1991 | Rhodes et al. | 156/253 |
| 5,055,332 A | | 10/1991 | Rhodes et al. | 428/74 |

(List continued on next page.)

FOREIGN PATENT DOCUMENTS

| | | | |
|---|---|---|---|
| EP | 742 231 A1 | 11/1996 | |
| EP | 803 236 A1 | 4/1997 | |
| EP | 784 116 A2 | 7/1997 | |
| EP | 789 048 A1 | 8/1997 | |
| EP | 797 966 A1 | 10/1997 | |
| EP | 758 220 B1 | 12/1998 | |
| EP | 720 488 B1 | 3/1999 | |
| EP | 724 418 B1 | 3/1999 | |
| EP | 725 613 B1 | 3/1999 | |
| EP | 725 615 B1 | 3/1999 | |
| EP | 725 616 B1 | 3/1999 | |
| WO | WO 95/14452 | 6/1995 | A61F/13/15 |
| WO | WO 95/27739 | 10/1995 | C08F/8/14 |
| WO | WO 95/31500 | 11/1995 | C08J/9/28 |
| WO | WO 96/09023 | 3/1996 | A61F/13/15 |
| WO | WO 96/25959 | 8/1996 | A61L/15/60 |
| WO | WO 97/06765 | 2/1997 | A61F/13/46 |
| WO | WO 98/01299 | 1/1998 | B32B/27/08 |
| WO | WO 98/12126 | 3/1998 | B65D/81/26 |

*Primary Examiner*—Sandra M. Nolan
(74) *Attorney, Agent, or Firm*—Jenkens & Gilchrist

(57) ABSTRACT

A continuous chain of connected absorbent pouches comprises a first panel, a second panel, and a super-absorbent material. Each of the absorbent pouches is adapted to absorb liquids. The first panel and the second panel are attached to each other along their respective general peripheries so as to form a space therebetween. The space comprises super-absorbent material. At least one of the first and second panels has at least one hole formed therein. The hole is of sufficient size to be permeable to liquid. Each of the pouches is adapted to absorb at least about 20 times its own weight of a 0.9 wt. % saline solution in an unloaded condition.

33 Claims, 2 Drawing Sheets

U.S. PATENT DOCUMENTS

| | | | |
|---|---|---|---|
| 5,090,832 A | 2/1992 | Rivera et al. | 401/132 |
| 5,094,559 A | 3/1992 | Rivera et al. | 401/132 |
| 5,128,082 A | 7/1992 | Makoui | 264/112 |
| 5,135,787 A | 8/1992 | Bair | 428/36.1 |
| 5,147,343 A | 9/1992 | Kellenberger | 604/368 |
| 5,175,279 A | 12/1992 | Kurane et al. | 536/123 |
| 5,188,624 A | 2/1993 | Young, Sr. et al. | 604/378 |
| 5,195,465 A | 3/1993 | Webb et al. | 119/172 |
| 5,320,895 A | 6/1994 | Larsonneur et al. | 428/137 |
| 5,352,780 A | 10/1994 | Webb et al. | 536/56 |
| 5,356,678 A | 10/1994 | Heitzhaus et al. | 428/35.6 |
| 5,378,528 A | 1/1995 | Makoui | 428/219 |
| 5,389,374 A | 2/1995 | Brown-Skrobot | 424/431 |
| 5,409,765 A | 4/1995 | Boettcher et al. | 428/224 |
| 5,453,323 A | 9/1995 | Chambers et al. | 428/402 |
| 5,458,899 A | 10/1995 | Floyd et al. | 426/404 |
| 5,478,894 A | 12/1995 | Chiang et al. | 525/369 |
| 5,505,950 A | 4/1996 | Floyd et al. | 426/404 |
| 5,506,277 A | 4/1996 | Griesbach, III | 521/84.1 |
| 5,506,324 A | 4/1996 | Gartner et al. | 526/318.41 |
| 5,514,120 A | 5/1996 | Johnston et al. | 604/378 |
| 5,532,350 A | 7/1996 | Cottrell et al. | 536/76 |
| 5,562,649 A | 10/1996 | Chauvette et al. | 604/375 |
| 5,629,377 A | 5/1997 | Burgert et al. | 524/832 |
| 5,633,316 A | 5/1997 | Gartner et al. | 525/54.32 |
| 5,641,503 A | 6/1997 | Brown-Skrobot | 424/431 |
| 5,655,708 A | 8/1997 | Gröne | 229/407 |
| 5,660,868 A | 8/1997 | Yeager | 426/124 |
| 5,679,369 A | 10/1997 | Brown-Skrobot | 424/431 |
| 5,693,707 A | 12/1997 | Cheng et al. | 524/556 |
| 5,705,182 A | 1/1998 | Brown-Skrobot | 424/431 |
| 5,709,089 A | 1/1998 | Dawson et al. | 62/4 |
| 5,709,897 A | 1/1998 | Pearlstein | 426/106 |
| 5,720,999 A | 2/1998 | Lanzani et al. | 426/129 |
| 5,728,446 A | 3/1998 | Johnston et al. | 428/167 |
| 5,733,271 A | 3/1998 | Bj.o slashed.rn | 604/333 |
| 5,747,082 A | 5/1998 | Floyd et al. | 426/109 |
| 5,753,252 A | 5/1998 | Brown-Skrobot | 424/431 |
| 5,763,067 A | 6/1998 | Bruggemann et al. | 428/317.9 |
| 5,789,076 A | 8/1998 | Isohata | 428/315.9 |
| 5,801,116 A | 9/1998 | Cottrell et al. | 502/404 |
| 5,804,241 A | 9/1998 | Isohata | 426/415 |
| 5,817,300 A | 10/1998 | Cook et al. | 424/66 |
| 5,817,400 A | 10/1998 | Chen et al. | 428/153 |
| 5,820,955 A | 10/1998 | Brander | 428/35.7 |
| 5,833,972 A | 11/1998 | Wood et al. | 424/76.5 |
| 5,839,572 A | 11/1998 | Yeager | 206/204 |
| 5,845,769 A | 12/1998 | Yeager | 206/204 |
| 5,856,410 A | 1/1999 | Carrico et al. | 525/362 |
| 5,865,824 A | 2/1999 | Chen et al. | 604/378 |
| 5,866,242 A | 2/1999 | Tan et al. | 428/219 |
| 5,869,027 A | 2/1999 | Wood et al. | 424/76.5 |
| 6,071,580 A * | 6/2000 | Bland et al. | 428/36.5 |
| 6,095,325 A * | 8/2000 | Simhaee | 206/204 |

* cited by examiner

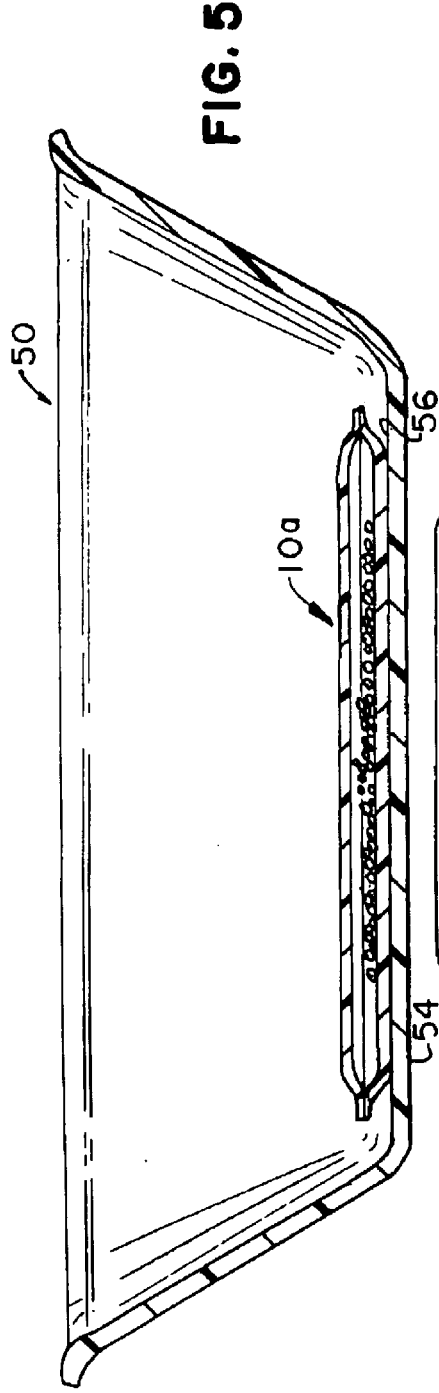
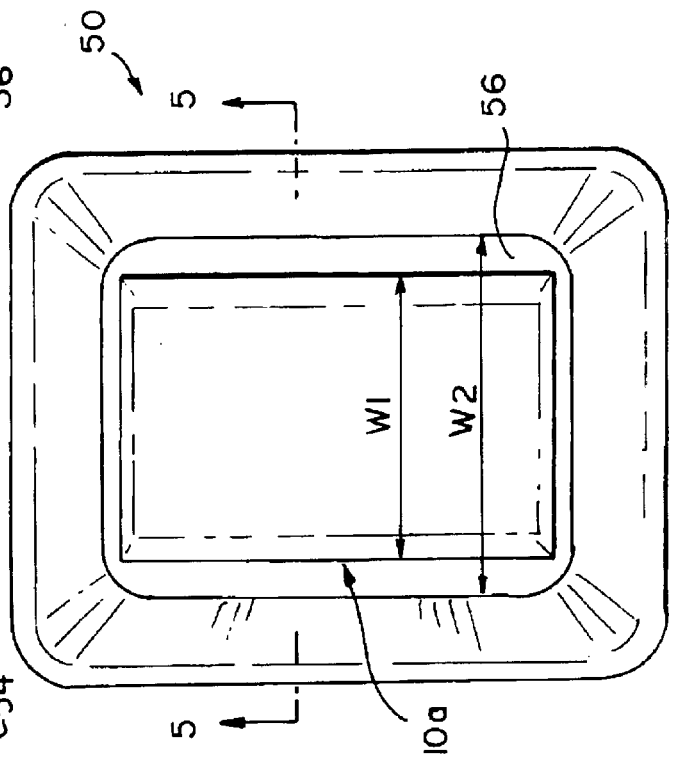

PROCESSES OF USING AT LEAST ONE ABSORBENT POUCH

This application is a divisional of U.S. patent application Ser. No. 09/373,291, filed Aug. 12, 1999, entitled "Absorbent Pouches and Methods of Using the Same," which was filed on Aug. 12, 1999. U.S. application Ser. No. 09/373,291 issued as U.S. Pat. No. 6,491,993 on Dec. 10, 2002, and is incorporated by reference in its entirety.

FIELD OF INVENTION

This invention relates to absorbent pouches and methods of using the same. More specifically, the invention relates to pouches having super-absorbent material which facilitate the packaging of meat, fish, poultry, and other food product(s).

BACKGROUND OF THE INVENTION

The use of various food packaging trays or containers has been popular for numerous years. These trays have been used by grocery stores, food packers, catering services, meat markets, and butcher shops to support and display food products on sale. These trays typically support the food products while one or more layers of plastic wrap are used to cover the food products to inhibit or prevent leakage. The trays that support food products such as meat and poultry are often stacked, shipped, and/or stored several trays high, the weight of each tray bearing on those below.

The natural juices/liquids of these products may seep away from the products and onto the food packaging tray. This problem may be exacerbated when multiple trays are stacked on each other, resulting in additional weight and pressure bearing on the food product. During shipping, storing, and handling, the juices/liquids may congregate within the tray, which can result in leakage through the plastic wrap. These juices/liquids can leak, for example, between the tray and the plastic wrap, onto a hand or arm of a customer, which can lead to customer dissatisfaction. Extreme customer dissatisfaction can result if these liquids flow onto the apparel of a customer. Even if the juices/liquids do not contact a customer, it is generally not aesthetically pleasing to observe liquids leaking from a food packaging tray. This will most likely have an adverse effect on the sale of a food product.

Methods of collecting or absorbing these juices/liquids may involve using pads, pouches, or pouch pads in the tray. The pads, pouches, or pouch pads are typically placed on a top surface of the tray. Pads, pouches, and pouch pads may include multiple inner layers of cellulose surrounded by outer layers of a perforated polyethylene film. The outer layers of the pads are attached on two sides, while the outer layers of the pouches are attached on all four sides.

There are many disadvantages of existing pads, pouches, and pouch pads. For example, the absorbency under unloaded, and especially under loaded conditions, may not be desirable. This may result in sloshing and spilling occurring within such food packaging trays. In addition, the juices/liquids in existing food packaging trays may still be visible to the customer and, thus, are not aesthetically pleasing. There are also disadvantages with the volume associated with existing pads and existing pouches that include inserts or pads. This additional volume may lead to higher transportation costs as well as being less aesthetic to customers. Existing pads and pouches may have additional manufacturing costs associated thereto as a result of having absorbent material being placed in the fibers or layers of the pads, as well as the cost associated with the fibers. Additional manufacturing costs may also be present in making and placing an insert or pad within a pouch.

In addition, there are other disadvantages with at least some of the existing pads, pouches, and pouch pads being of a sufficient rigidity. The rigidity of at least one of the layers of these structures is beneficial when the structures are attached to trays via machinery. Machinery is generally used in commercial settings when making a pre-padded tray. A pre-padded tray is a tray with a structure (e.g., a pad, pouch, or pad pouch) attached therein. At least some of the existing structures are not formed in a manner conducive to being attached to a tray via machinery.

Accordingly, a need exists for a pouch which overcomes the above-noted shortcomings associated with existing pads, pouches, and/or pouch pads.

SUMMARY OF THE INVENTION

In one particular embodiment of the present invention, a continuous chain of connected absorbent pouches comprises a first panel, a second panel, and super-absorbent material. Each of the absorbent pouches is adapted to absorb liquids. The first and second panels are attached to each other along their respective general peripheries so as to form a space therebetween. The space comprises the super-absorbent material. At least one of the first and second panels has at least one hole formed therein. The hole is of sufficient size to be permeable to liquid, and each of the pouches is adapted to absorb at least about 20 times its own weight of a 0.9 wt. % saline solution in an unloaded condition.

In another embodiment of the present invention, an absorbent pouch, which is adapted to absorb liquids, comprises a first panel, a second panel, and a super-absorbent material. The first and second panels are attached to each other along their respective general peripheries so as to form a space therebetween. The space comprises the super-absorbent material. At least one of the outer panels has at least one hole formed therein. The hole is of sufficient size to be permeable to liquid. At least one of the first and second outer panels is made from a polymeric foam. The pouch is adapted to absorb at least about 20 times its own weight of a 0.9 wt. % saline solution in an unloaded condition. The absorbent pouches may be in a continuous chain of connected absorbent pouches.

BRIEF DESCRIPTION OF THE DRAWINGS

Other objects and advantages of the invention will become apparent upon reading the following detailed description and upon reference to the drawings.

FIG. 4 is a top view of a tray with an absorbent pouch according to yet another embodiment of the present invention.

FIG. 5 is a cross-section view taken along line 5—5 in FIG. 4.

Figure 1:
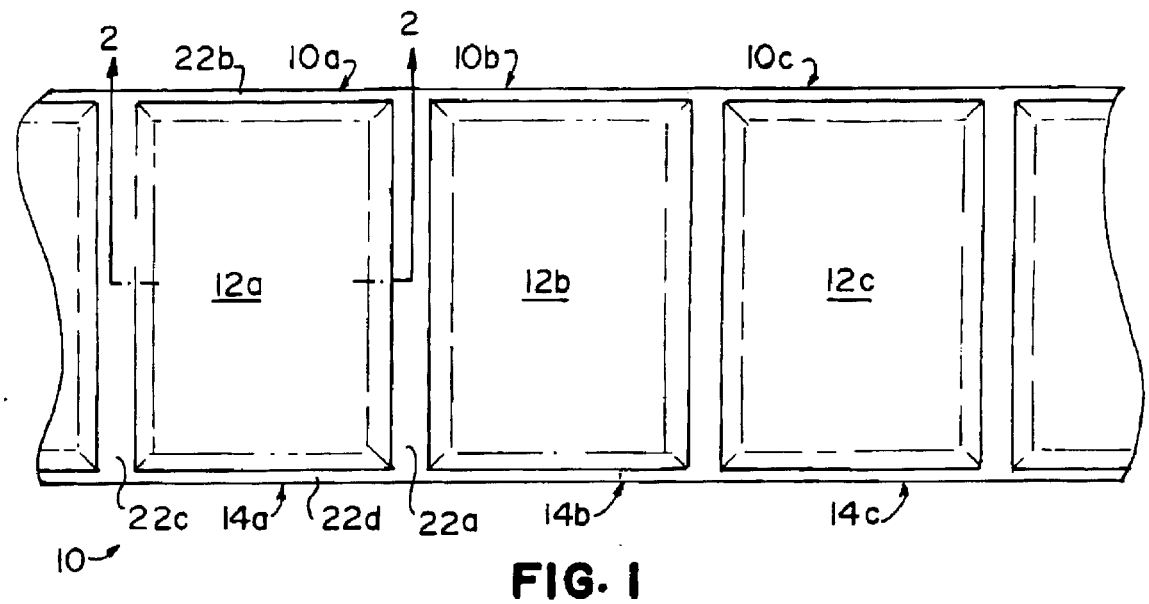
FIG. 1 is a top plan view of a continuous chain of connected absorbent pouches according to one embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, to cover all modifications, equivalents, and alternatives falling within the spirit and scope of the invention as defined by the appended claims.

DESCRIPTION OF ILLUSTRATIVE EMBODIMENTS

Figure 2:
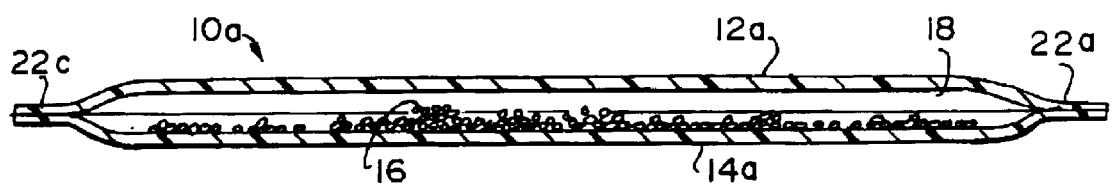
FIG. 2 is a sectional view taken generally through line 2—2 in FIG. 1.

FIG. 1 depicts a continuous chain of connected absorbent pouches 10 according to one embodiment of the present invention. A pouch 10a is comprised of two panels 12a, 14a that are connected around its generally periphery. Similarly, the other pouches 10b, 10c are comprised of two layers (12b, 14b and 12c, 14c, respectively) that are connected around its general periphery. As shown in FIG. 2, the pouch 10a includes a super-absorbent material (SAM) 16 that is located within a space 18 defined by the connection of the two panels 12a, 14a. The pouches 10b, 10c are the same as the pouch 10a and, therefore, will not be discussed for sake of brevity. While the pouches 10 are depicted in FIG. 1 as being of a generally rectangular configuration, the invention disclosed herein is not intended to be limited thereto, but may take various other geometric shapes, such as oval, square, circular, and polygonal.

The first and second panels 12, 14 may be made from a variety of materials, such as woven material, non-woven material, liquid-permeable or perforated film, impermeable film, open-celled polymeric foam, and close-celled polymeric foam. The open-celled and close-celled foams may also be perforated.

Woven material is generally defined as long fibers that are intertwined to produce a material. Non-woven material is generally defined as randomly joined fibers that are bonded or pressed together by adhesive or other means. The randomly joined fibers that form non-woven material are typically shorter than those used in woven material.

The liquid-permeable film, perforated film or impermeable film may be made from polymeric materials such as polyolefins. The term "polyolefins" as used herein includes polyethylenes and polypropylenes. The term "polyethylene" as used herein includes low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE), and combinations thereof. The term "polypropylene" used herein includes homopolymers, copolymers, impact modified grades, and combinations thereof.

The open-celled and close-celled polymeric foams include alkenyl aromatic foams. The term "alkenyl aromatic polymer" as used herein includes polymers of aromatic hydrocarbon molecules that contain an aryl group joined to a olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, vinyl toluene, and the like. Alkenyl aromatic polymers also include homopolymers of styrene (commonly referred to as polystyrene) and copolymers of styrene and butadiene (commonly referred to as impact polystyrene). The alkenyl aromatic polymers of the present invention can be obtained by blending two or more alkenyl aromatic polymers.

At least one of the first and second panels 12, 14 is made of a material that facilitates the permeation of the liquid/juices (i.e., a hydrophilic material). For example, this panel may be made of a woven material, non-woven material, liquid-permeable film, perforated film, perforated close-celled polymeric foam, or open-celled polymeric foam. At least one of the panels 12, 14 is made of a material having a pore size or at least one hole/opening sufficient to permit the juices/liquid to flow through the panel and contact the super-absorbent material 16.

Each of the plurality of holes/openings extends from an outer surface of the panel through the inner surface of the panel. If only one panel facilitates the permeation of the liquid/juices, then it is preferred that this panel is the bottom panel, such as panel 14a of pouch 10a. It is contemplated that the plurality of holes may vary in size, shape, and location as long as the juices/liquid can flow and contact the super-absorbent material 16.

The panel(s) preferably has pores and/or holes sized to prevent or inhibit the super-absorbent material 16 from leaving the space 18 of the pouch 10a. It is preferred that the first and second layers 12a, 14a not be penetrated by particles greater than about 0.1 mm in diameter. It is preferred that the pore size and plurality of holes have an average diameter of less than about 0.1 mm.

The pouch 10a, as shown in FIG. 1, is connected along the general peripheries of first and second panels 12a, 14a along sections 22a–22d. The pouch may, however, be formed by other methods. For example, a pouch may be made from one panel that is folded along one side (not shown) and connected along the remaining three sides after the super-absorbent material has been added. Similarly, a pouch may be made from one panel that is folded along one side (not shown) and connected along two sides. The super-absorbent material is added to the open side of the pouch before it is connected.

As shown in FIG. 2, the super-absorbent material 16, which absorbs the juices/liquids of the food product, is located between the first and second panels 12a, 14a in the space 18. The super-absorbent material 16 generally absorbs at least about 20 times its own weight of a 0.9 wt. % saline solution (0.9 wt. % sodium chloride and 99.1 wt. % water) in an unloaded condition. An unloaded condition is defined herein as a condition where the growth of the super-absorbent material is not restricted or confined by anything other than its own mass. It is preferable that the super-absorbent material 16 absorb at least about 25 times its own weight and, more preferably, at least about 30 times its own weight of a 0.9 wt. % saline solution in an unloaded condition. The super-absorbent material 16 generally absorbs at least about 20 times its own weight of a 0.9 wt. % saline solution under a load of 0.1 pounds per square inch (psi), and preferably at least about 25 times its own weight of a 0.9 wt. % saline solution under a load of 0.1 psi.

Examples of super-absorbent materials that may be used are crosslinked polyacrylates, such as FAVOR-PAC™ 100 manufactured by Stockhausen. The super-absorbent material 16 of the present invention may be discrete particles, such as granules. The pouch generally has from about 1 to about 10 grams of super-absorbent material 16 and is dependent on the desired amount of liquid/juices to be absorbed.

The super-absorbent material 16 is free-flowing within the space 18 and preferably is not confined within other material (e.g., tissue or separate panels) located within the space 18 of the pouch 10a. To allow the super-absorbent material 16 to distribute itself within the space 18, the space 18 of the pouch preferably is not occupied by fibrous material, gel strips, or other material.

Surprisingly, the super-absorbent material does not need to be immobilized to produce a pouch that effectively absorbs juices/liquid because the super-absorbent material has a fluidity that allows it to distribute, migrate, or flow to the lower pressure areas of the pouch. Thus, the pouch of the present invention does not need to add additional material between the first and second panels. For example, there is no need to have plies of tissue paper bonded between the first and second panels or loose cellulose fiber or fibrous material to retain the super-absorbent material within the space 18 of the pouch 10a.

The absence of tissue paper, separate panels, fibrous material, gel strips, or other material within the space 18 reduces the cost of manufacturing the pad since it does not require the cost of additional material and/or the cost associated with extra process steps, such as, for example, bonding the fibrous material to the super-absorbent material. The pouch is also thinner without adding these materials, which is advantageous since it reduces the volume of the pouches or pre-padded trays. Therefore, the space 18 preferably comprises 100 wt. % of the super-absorbent material located between the first and second panels.

In another embodiment of the present invention, the super-absorbent material 16 may be in contact with, embedded in, pressed in, partially embedded in, adhered with an adhesive thereto, or any combination thereof, the first panel 12a and/or second panel 14a.

As discussed above, the panels of the pouch in the present invention may be comprised of various materials. For example, the pouch may have first and second panels made of non-woven material. According to another embodiment, the first panel is made of a liquid impermeable film and the second panel is made of a non-woven material. According to yet another embodiment, the first panel is made of a polymeric foam and the second panel is made of a non-woven material. According to yet another embodiment, the first panel is made of a polymeric foam and the second panel is made from a perforated polyolefin film (e.g., a polyethylene film).

Figure 3:
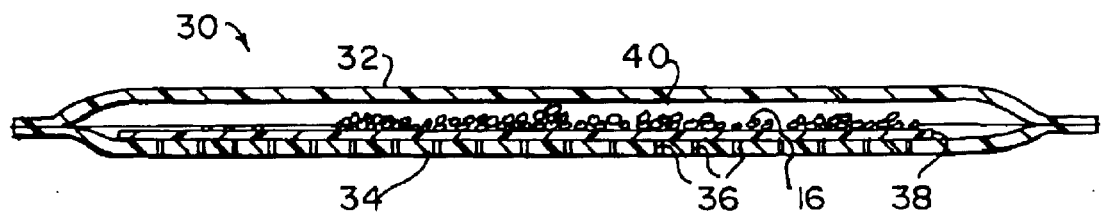
FIG. 3 is a sectional view of an absorbent pouch according to another embodiment of the present invention.

Alternatively, as shown in FIG. 3, a pouch 30 comprises a first panel 32 made from an impermeable material and a second panel 34. The second panel 34 has a plurality of large pore perforations 36 extending through the second panel 34. The diameter of the pore perforations is sized to facilitate permeation of the liquids/juices. The diameter of the large pore perforations 36 is generally from about 0.1 mm to about 5 mm and preferably from about 1 mm to about 3 mm. The second panel is made of a polymeric foam, such as polystyrene.

A suitable heat sealable filter material 38 is thermally bonded to the second panel 34. The filter material 38 is permeable to water and preferably has a plurality of holes (not shown) that are permeable to water. The plurality of holes also preferably inhibits or prevents the super-absorbent material from escaping a space 40 of the pouch 30. The filter material 38 may be formed of a non-woven material. The super-absorbent material 16 is located on a surface of the filter material 38 in the space 40.

Pouches, such as pouch 30, are preferably made of a rigid material like polystyrene so as to assist in applications such as in-line packaging machines. Machinery, such as in-line packaging machines, performs more effectively when using a rigid material such as polystyrene. Forming a pouch with a polystyrene panel also has other advantages. For example, if the pouch 30 includes panel 34 being made with polystyrene, then it is more compatible to a polystyrene tray than if the panel 34 was made from other materials. The pouch 30 with a polystyrene panel 34 is more compatible with a polystyrene tray because the selected adhesive used in securing the pouch to the tray is better suited for securing only one material (polystyrene) as opposed to two different materials.

Referring to FIGS. 4 and 5, a tray 50, according to one embodiment, is shown that includes, for example, a pouch 10a. Referring to FIG. 5, the tray 50 comprises a side wall 52 and a bottom wall 54. The side wall 52 encompasses the bottom wall 54 and extends generally vertical and outward therefrom. The side and/or bottom walls 52, 54 may be formed from a single layer or a plurality of layers. The side wall 52 inhibits the food product and the juices/liquids from leaving the tray, especially when the tray 50 is tilted. The side wall 52 may extend outward from the bottom wall 54 at different angles than that shown in FIG. 5. It is not necessary, however, for the side wall 52 to extend outward relative to the bottom wall 54. For example, the side wall 52 may be generally perpendicular to the bottom wall 54 or may even extend inward from the bottom wall 54.

The pouch 10a is attached to the tray 50 by a suitable adhesive. The adhesive is located between an upper surface 56 of the bottom wall 54 and a bottom surface of the pouch 10a. The selection of the adhesive is based on its compatibility with the materials used in forming the pouch and the tray.

Referring back to FIG. 4, the pouch 10a has a smaller width W1 than a width W2 of the upper surface 56 of the bottom wall 54. It is contemplated that the width W1 of the pouch 10a may generally correspond to the entire bottom surface 56 of the bottom wall 54, such as covering the entire bottom surface 56 of the bottom wall 54. It is also contemplated that the pouch 10a may be used with trays other than the tray 50 shown in FIGS. 4 and 5.

The tray 50 may be manufactured from various materials. It is contemplated that the side wall 52 and the bottom wall 54 may be made from paperboard (cellulose), alkenyl aromatic polymers, polyolefins, polyesters and combinations thereof. Other materials may be incorporated to enhance the properties. For example, materials such as ethylene ethyl acrylate (EEA), ethylene methyl acrylate (EMA), ethylene acrylic acid (EAA), ethylene methacrylic acid (EMAA), ethylene vinyl alcohol (EVOH), ethylene vinyl acetate (EVA), ionomer, and combinations thereof may be used in forming the tray 50. The tray 50, however, is typically made from alkenyl aromatic polymers (like polystyrene) or paperboard. Paperboard trays may be coated or laminated with a different material(s), such as polyethylene, polyester, polypropylene, and polyethylene terephthalate (PET).

The pouches of the present invention may be used in "pre-padded" trays, including "case ready" trays. Pre-padded trays are defined as trays with a pouch attached to a surface of the tray. Case ready trays typically refer to trays that are "pre-padded" and have been packaged with meat. The pre-padded trays may be packaged with a variety of food products. The food products packaged in pre-padded trays include poultry, meat, fish, and produce. These packaged trays may be distributed to stores for sale to customers without any additional steps, such as those performed in a meat packaging section.

The thickness of the pouches is generally from about 5 to about 200 mil prior to hydration. The thickness of the pouches is typically from about 5 mil to about 100 mil and from 15 mil to about 80 mil prior to hydration. The thickness of the pouches varies on factors such as whether the pouch is made from a polymeric foam, a woven material, a non-woven material, or a film.

The thickness of a panel made from a polymeric foam is generally from about 15 to about 200 mil. A panel of woven material generally has a thickness from about 1 to about 10 mil, while a panel of non-woven material generally has a thickness from about 1 to about 10 mil. A panel of film generally has a thickness of from about 0.2 to about 2 mil. After the super-absorbent material absorbs the juices/liquids from the food product, the thickness of the pouches increases. The amount of the increase depends on the amount of liquid absorbed and the amount of downward force exerted by any food products located above the pouch.

The pouches may vary in size depending on the desired application. The pouches are generally from about 2 to about 15 inches in width, and from about 2 to about 20 inches in length. The width of the pouch is typically from about 3 to about 12 inches in width. Typical sizes of the pouches include 4 inches by 6 inches and 5.5 inches by 12 inches.

Processes of the Present Invention

The absorbent pouches of the present invention may be formed using conventional methods. For example, in one process of the present invention, a first panel and a second panel are heat-sealed to each other around three of the four respective edges to form an open-sided pouch. A super-absorbent material is then added inside of the pouch. The remaining edges of the first and second panels are heat-sealed to each other to form a closed pouch containing the super-absorbent material. This process may be used in forming a roll of continuous chain of connected absorbent pouches with each having super-absorbent material contained therein.

According to another method, the super-absorbent material may also be placed on an inner surface of a first panel before a second panel is connected thereto. The first and second panels are then heat-sealed along their respective four sides so as to enclose the super-absorbent material therein.

Alternatively, a first panel may be folded along a fold line and heat-sealed along the two sides adjacent the folded side to form an open-sided pouch. The super-absorbent material is then added to the pouch. The remaining edges of the first panel are heat-sealed to each other to form a closed pouch containing the super-absorbent material.

According to one process of the present invention, a continuous chain of connected absorbent pouches is provided. Each of the pouches comprises a first panel, a second panel, and a super-absorbent material. The first and second panels are attached to each other along their respective general peripheries so as to form a space therebetween. The space may comprise super-absorbent material. At least one of the first and second panels has at least one hole formed therein. The hole is of sufficient size to be permeable to liquid, and each of the pouches is adapted to absorb at least about 20 times its own weight of a 0.9 wt. % saline solution in an unloaded condition. One of the connected absorbent pouches is severed from the continuous chain of pouches at a selected length. A tray, such as shown in FIGS. 4 and 5, may be provided. The process, of course, is not limited to the tray 50 of FIGS. 4 and 5. One of the severed absorbent pouches is attached to a respective one of the trays via attaching means so as to form a pre-padded tray. The attaching means may include adhesives or thermal attachments.

The process may result in the continuous chain of connected absorbent pouches being wound in a roll. In addition, a food product may be added to the pre-padded tray, such as, for example, poultry, meat, fish, or produce.

According to another process, at least one absorbent pouch is used to form at least one pre-padded tray. At least one of the first and second outer panels is made from a polymeric foam. A tray, such as shown in FIGS. 4 and 5, may be provided. The process, of course, is not limited to the tray 50 of FIGS. 4 and 5. One of the absorbent pouches is attached to a respective one of the trays so as to form a pre-padded tray. The absorbent pouches may be attached by adhesives or thermal attachments. The process may begin with a chain of continuous connected absorbent pouches. If such a chain is used, then the chain is preferably severed at selected lengths.

In an embodiment having at least one layer made from polystyrene, the step of heat-sealing clarifies the polystyrene layer by making the material more transparent as compared to a portion of the polystyrene layer that has not been heat-sealed. This assists in identifying the areas where the continuous chain of connected absorbent pouches is to be severed. This is especially useful in applications where the continuous chains of connected pouches is severed at high speeds.

The first and second panels may be formed using conventional processes. For example, if a panel is made of a film, it may be formed using an extruder or by using injection-molded apparatus. If a panel is formed of a polystyrene, the panel may be formed by materials such as a polystyrene resin, a blowing agent, a nucleating agent, a stability control agent, as well as other conventional additives. These materials may be extruded from a die to form a foam.

EXAMPLES

Various comparative pads, pouches, and pouch pads were tested at an unloaded condition (0 load) and a loaded condition (0.1 pounds per square inch or psi). The results of the test appear in the Table.

The tested pads were comprised of tissue paper or cellulose in which some of the pads had distinct inner layers of tissue paper that are commonly referred to as plies. The outer layers of the tested pads were comprised of a perforated polyolefinic film. The ply pads were formed by sealing two sides of each of the outer layers together.

Comparative Airlaid Pad 1 did not have distinct layers of tissue paper. Comparative Ply Pads 2–4, however, each had a plurality of layers of tissue paper (plies). Comparative Ply Pads 2 and 3 had 11 plies, while Comparative Ply Pad 4 had 17 plies. Comparative Pads 1–4 are commercially available. Comparative Pad 1 was manufactured by Kimberly Clark, Comparative Pad 2 was manufactured by Paperpack, while Comparative Pads 3 and 4 were manufactured by SEALED AIR®.

Comparative Pouch Pads 5–7 comprised a pouch that contained a paper ply pad inserted therein. Comparative Pouch Pads 5–7 had a pad portion with similar inner and outer layers as present in the tested ply pads. Comparative Pouch Pads 5–7, however, were formed by sealing all four sides of the outer layers together. The pouch portion of Comparative Pouch Pads 5–7 comprised perforated polyethylene film. Comparative Pouch Pads 5–7 are commercially available. Comparative Pouch Pads 5 and 6 were manufactured by Paperpack, while Comparative Pouch Pad 7 was manufactured by SEALED AIR®.

Comparative Pouches 8 and 9 were pouches that included at least one 2 inch by 4 inch insert. Comparative Pouch 8 had two inserts, while Comparative Pouch 9 had one insert. The insert bonded super-absorbent powder (sodium polyacrylate particles) between two pieces or layers of tissue paper. The insert was located within the tissue paper in the pouch.

Comparative Pouch Pad (Sachet) 10 was a small size pouch pad (about 3 inches by 3.25 inches) that included an absorbent material (carboxymethylcellulose type particles) located inside the pouch. Comparative Pouches 8–10 are commercially available. Comparative Pouches 8 and 9 were manufactured by Paperpack, while Comparative Pouch Pad 10 was manufactured by Maxwell Chase Technologies.

Inventive Pouch 11 was a 4 inch by 6 inch pouch that contained free-flowing super-absorbent material (a crosslinked polyacrylate). Inventive Pouch 11 included panels made from polyethylene film. The crosslinked polyacrylate was manufactured by Stockhausen under the trade name FAVOR-PAC™ 100.

The first tested condition was an unloaded condition (0 load), while the second tested condition was a loaded condition (0.1 pounds per square inch or psi). The loaded condition of 0.1 psi was obtained by placing a 2.4 lb. weight on a top surface of the pad or pouch. This weight was generally evenly distributed across the top surface of the pad or pouch. Three samples of each of the comparative pads or pouches were tested for absorbency at each condition. One sample of Inventive Pouch 11 was tested for absorbency at each condition.

The weight of the pad, pouch pad, or pouch was initially measured before the 0.9 wt. % saline solution was added. This included the weight of the absorbent material in the pad or pouch. The weight of the pad, pouch pad, or pouch was then measured 24 hours after an excessive amount of the 0.9 wt. % saline solution was applied or put in contact with the absorbent material (i.e., weight of pad, pad pouch, or pouch +absorbent material +absorbed saline solution). Using these weights, the ratio of absorbed saline solution to the weight of the pad, pouch pad, or pouch (absorbency in g/g of the 0.9% saline solution amount) was calculated for the loaded and unloaded conditions. The results are shown in the Table.

TABLE

|  | Absorbency (g/g) of 0.9% Saline Solution | |
| --- | --- | --- |
|  | Unloaded ("0 Load") | 0.1 psi |
| Comparative Airlaid Pad 1 | 13.1 | 7.0 |
| Comparative 11 Ply Pad 2 | 11.6 | 7.5 |
| Comparative 11 Ply Pad 3 | 13.6 | 10.0 |
| Comparative 17 Ply Pad 4 | 12.4 | 9.1 |
| Comparative 150 g Pouch Pad 5 | 8.5 | 5.4 |
| Comparative 75 g Pouch Pad 6 | 13.0 | 6.0 |
| Comparative 50 g Pouch Pad 7 | 12.6 | 8.0 |
| Comparative 150 g Pouch (with insert) 8 | 10.7 | 9.1 |
| Comparative 75 g Pouch (with insert) 9 | 11.0 | 7.9 |
| Comparative Pouch Pad (Sachet) 10 | 10.3 | 6.7 |
| Inventive Pouch with SAM 11 | 32.0 | 22.0 |

As shown in the Table, Inventive Pouch 11 absorbed 32 g/g in the unloaded condition and 22 g/g in the 0.1 psi loaded condition. Inventive Pouch 11 had a much better absorbency ratio (absorbed saline solution/weight of pad, pouch, or pouch pad) than any of the other tested comparative pads, pouches, or pouch pads. The comparative pads, pouches, or pouch pads ranged from 8.5 to 13.6 g/g in the unloaded condition, while the comparative pads, pouches, and pouch pads ranged from 5.4 to 10.0 g/g in the 0.1 psi loaded condition.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the present invention, which is set forth in the following claims.

What is claimed is:

1. A process of using absorbent pouches to form pre-padded trays, comprising:
   providing a continuous chain of connected absorbent pouches, each of said absorbent pouches adapted to absorb liquids, each of said pouches comprising a first panel, a second panel, and a super-absorbent material, said first panel and said second panel being attached to each other along their respective general peripheries so as to form a space therebetween, said space consisting essentially of said super-absorbent material and in the absence of tissue paper, fibrous material and gel strips, at least one of said first and second panels having at least one hole formed therein, said at least one hole being of sufficient size to be permeable to liquid, and each of said pouches adapted to absorb at least about 20 times its own weight of a 0.9 wt. % saline solution in an unloaded condition;
   severing one of said connected absorbent pouches from said continuous chain of pouches at a selected length;
   providing trays; and
   attaching one of said severed absorbent pouches to a respective one of said trays via an attaching means so as to form the pre-padded tray.

2. The process of claim 1, wherein said selected lengths of said absorbent pouches are less than the lengths of said trays.

3. The process of claim 1, wherein said selected lengths of said absorbent pouches generally correspond to the lengths of trays.

4. The process of claim 1, wherein said continuous chain of connected absorbent pouches is wound in a roll.

5. The process of claim 1 further including adding a food product to the pre-padded tray.

6. The process of claim 1, wherein said super-absorbent material is adapted to absorb at least about 25 times its own weight of a 0.9 wt. % saline solution in an unloaded condition.

7. The process of claim 6, wherein said super-absorbent material is adapted to absorb at least about 30 times its own weight of a 0.9 wt. % saline solution in an unloaded condition.

8. The process of claim 1, wherein at least one of said panels is made from a woven material, non-woven material, liquid-permeable film, perforated film, impermeable film, open-celled polymeric foam, and close-celled polymeric foam.

9. The process of claim 1, wherein each of said panels is independently made from a woven material, non-woven material, liquid-permeable film, perforated film, perforated close-celled polymeric foam, or open-celled polymeric foam.

10. The process of claim 1, wherein each of said first and second panels has a plurality of holes formed therein, said plurality of holes being of sufficient size to be permeable to liquid and of a sufficient size to inhibit said super-absorbent material from leaving said space.

11. The process of claim 1, wherein said pouch consists of said first panel, said second panel, and said super-absorbent material.

12. A process of using at least one absorbent pouch to form at least one pre-padded tray, comprising:
   providing at least one absorbent pouch adapted to absorb liquids, said pouch comprising a first panel, a second panel, and a super-absorbent material, said first panel and said second panel being attached to each other along their respective general peripheries so as to form a space therebetween, said space comprising said super-absorbent material, and at least one of said first and second panels having at least one hole formed therein, said hole being of sufficient size to be permeable to liquid, at least one of said first and second panels comprising a polymeric foam, and said pouch adapted to absorb at least about 20 times its own weight of a 0.9 wt. % saline solution in an unloaded condition;

providing at least one tray; and attaching one of said at least one absorbent pouch to a respective one of said tray via an attaching means so as to form the pre-padded tray.

13. The process of claim 12, wherein said at least one absorbent pouch is a chain of continuous connected absorbent pouches and further includes severing said chain of continuous connected absorbent pouches at a selected length.

14. The process of claim 12, wherein said super-absorbent material is adapted to absorb at least about 25 times its own weight of a 0.9 wt. % saline solution in an unloaded condition.

15. The process of claim 12, wherein at least one of said panels is made from an open-celled polymeric foam or a close-celled polymeric foam, said open-celled polymeric foam and said close-celled polymeric foam comprising an alkenyl aromatic polymer.

16. The process of claim 15, wherein said alkenyl aromatic polymer is polystyrene.

17. The process of claim 12, wherein at least one of said panels is made from an open-celled polymeric foam or a close-celled polymeric foam, said open-celled polymeric foam and said close-celled polymeric foam comprising at least one polyolefin.

18. The process of claim 12, wherein said super-absorbent material is a crosslinked polyacrylate.

19. The process of claim 12, wherein said at least one hole is a plurality of holes, the average diameter of said plurality of holes is less than about 0.1 mm.

20. The process of claim 12, wherein said pouch consists essentially of said first panel, said second panel, and said super-absorbent material.

21. The process of claim 12, wherein said space consists essentially of said super-absorbent material.

22. The process of claim 12, wherein said pouch consists of said first panel, said second panel, and said super-absorbent material.

23. The process of claim 12, wherein said first layer comprises a polymeric foam and the second layer comprises a non-woven material.

24. The process of claim 1, wherein each of said pouches comprises from about 1 to about 10 grams of said super-absorbent material.

25. The process of claim 1, wherein said super-absorbent material is a crosslinked polyacrylate.

26. The process of claim 1, wherein said super-absorbent material is a plurality of particles.

27. The process of claim 1, wherein the attaching means is an adhesive or thermal attachment.

28. The process of claim 12, wherein the attaching means is an adhesive or thermal attachment.

29. A process of using absorbent pouches to form pre-padded trays, comprising:

providing a continuous chain of connected absorbent pouches, each of said absorbent pouches adapted to absorb liquids, each of said pouches comprising a first panel, a second panel, and a super-absorbent material, said first panel and said second panel being attached to each other along their respective general peripheries so as to form a space therebetween, said space consists of said super-absorbent material, at least one of said first and second panels having at least one hole formed therein, said at least one hole being of sufficient size to be permeable to liquid, and each of said pouches adapted to absorb at least about 20 times its own weight of a 0.9 wt. % saline solution in an unloaded condition;

severing one of said connected absorbent pouches from said continuous chain of pouches at a selected length;

providing trays; and attaching one of said severed absorbent pouches to a respective one of said trays via an attaching means so as to form the pre-padded tray.

30. A process of using absorbent pouches to form pre-padded trays, comprising:

providing a continuous chain of connected absorbent pouches, each of said absorbent pouches adapted to absorb liquids, each of said pouches comprising a first panel, a second panel, and a super-absorbent material, said first panel and said second panel being attached to each other along their respective general peripheries so as to form a space therebetween, said space consisting essentially of said super-absorbent material, at least one of said first and second panels having at least one hole formed therein, said hole being of sufficient size to be permeable to liquid, and each of said pouches adapted to absorb at least about 20 times its own weight of a 0.9 wt. % saline solution in an unloaded condition, wherein at least one of said panels is made from an open-celled polymeric foam or a close-celled polymeric foam, said open-celled polymeric foam and said close-celled polymeric foam being made from an alkenyl aromatic polymer;

severing one of said connected absorbent pouches from said continuous chain of pouches at a selected length;

providing trays; and attaching one of said severed absorbent pouches to a respective one of said trays via an attaching means so as to form the pre-padded tray.

31. The process of claim 30, wherein each of the panels is made from an open-celled polymeric foam or a close-celled polymeric foam.

32. A process of using absorbent pouches to form pre-padded trays, comprising:

providing a continuous chain of connected absorbent pouches, each of said absorbent pouches adapted to absorb liquids, each of said pouches comprising a first panel, a second panel, and a super-absorbent material, said first panel and said second panel being attached to each other along their respective general peripheries so as to form a space therebetween, said space consisting essentially of said super-absorbent material, at least one of said first and second panels having at least one hole formed therein, said hole being of sufficient size to be permeable to liquid, and each of said pouches adapted to absorb at least about 20 times its own weight of a 0.9 wt. % saline solution in an unloaded condition, wherein at least one of said panels is made from an open-celled polymeric foam or a close-celled polymeric foam, said open-celled and said close- celled polymeric foam being made from at least one polyolefin;

severing one of said connected absorbent pouches from said continuous chain of pouches at a selected length;

providing trays; and attaching one of said severed absorbent pouches to a respective one of said trays via an attaching means so as to form the pre-padded tray.

33. The process of claim 32, wherein each of the panels is made from an open-celled polymeric foam or a close-celled polymeric foam.

* * * * *